US011921442B2

(12) United States Patent
Anzai et al.

(10) Patent No.: US 11,921,442 B2
(45) Date of Patent: Mar. 5, 2024

(54) TRANSPORT DEVICE AND IMAGE FORMING APPARATUS

(71) Applicant: FUJIFILM Business Innovation Corp., Tokyo (JP)

(72) Inventors: Takashi Anzai, Kanagawa (JP); Satoru Ishii, Kanagawa (JP); Toshio Takiguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/971,657

(22) Filed: Oct. 24, 2022

(65) Prior Publication Data

US 2023/0367242 A1 Nov. 16, 2023

(30) Foreign Application Priority Data

May 12, 2022 (JP) ................................ 2022-078710

(51) Int. Cl.
*G03G 15/08* (2006.01)

(52) U.S. Cl.
CPC ..... *G03G 15/0889* (2013.01); *G03G 15/0877* (2013.01); *G03G 2215/0827* (2013.01)

(58) Field of Classification Search
CPC ........... G03G 15/0865; G03G 15/0872; G03G 15/0877; G03G 15/0886; G03G 15/0889; G03G 15/0891; G03G 2215/0827
See application file for complete search history.

(56) References Cited

U.S. PATENT DOCUMENTS 8,768,222 B2 7/2014 Okamoto et al.
2013/0251412 A1* 9/2013 Okamoto ........... G03G 15/0886 399/258

FOREIGN PATENT DOCUMENTS

JP 5354312 11/2013
JP 2015007684 1/2015

* cited by examiner

*Primary Examiner* — Hoang X Ngo
(74) *Attorney, Agent, or Firm* — JCIPRNET

(57) ABSTRACT

A transport device includes a transport path that includes an opening through which a developer flows into the transport path, an opening and closing portion that is provided to be movable along the transport path and that opens and closes the opening, and a transport body that is disposed in the transport path, that includes a blade formed in a spiral shape on an outer periphery of a shaft portion, that transports the developer flowing into the transport path through the opening and moves the opening and closing portion to an opening position with the blade by rotating forward, and that idly rotates with respect to the opening and closing portion moved to the opening position in a case of forward rotation.

16 Claims, 13 Drawing Sheets

TRANSPORT DEVICE AND IMAGE FORMING APPARATUS

CROSS-REFERENCE TO RELATED APPLICATIONS

This application is based on and claims priority under 35 USC 119 from Japanese Patent Application No. 2022-078710 filed May 12, 2022.

BACKGROUND

(i) Technical Field

The present invention relates to a transport device and an image forming apparatus.

(ii) Related Art

Disclosed in JP2015-7684A is a toner cartridge including a toner accommodation portion that is formed in a box-like shape and that accommodates toner, a toner discharge portion that is provided on one end side in a longitudinal direction of the toner accommodation portion, a toner transport screw that includes a rotary shaft and a spiral blade and that transports the toner in the toner accommodation portion to the toner discharge portion, an internal shutter that is disposed inside the toner discharge portion and that separates the toner accommodation portion and the toner discharge portion from each other. A toner discharge port through which the toner in the toner discharge portion is discharged to the outside is open and formed in a circumferential wall of the toner discharge portion, and the internal shutter moves along an axial direction along the rotary shaft as the toner transport screw rotates so that the toner cartridge enters an available state and includes a detection target portion via which a shutter position detection unit for detection of movement of the internal shutter detects passage of the internal shutter through the toner discharge port.

Disclosed in JP2013-200481A is a powder supply device including a housing that is provided with an opening for reception of powder sent from a powder accommodation portion accommodating the powder, that extends toward a supply target body to which the powder is supplied, and of which at least an inner part has a box-like shape, a transport member that is disposed in the housing, that extends in a transport direction in which the powder is transported, and that rotates to transport the powder entering the housing through the opening toward the supply target body, and a shutter member that is at a closing position at which the opening is closed and that receives a force from the transport member resulting from rotation of the transport member to move to an opening position at which the opening is opened. The transport member includes a transport portion that contributes to transportation of the powder and a non-transport portion that does not contribute to the transportation and that takes charge of movement of the shutter member toward the opening position, and the shutter member is moved toward the opening position by the action of the non-transport portion.

SUMMARY

As a transport device, a transport device including a transport path that includes an opening through which a developer flows into the transport path, an opening and closing portion that is provided to be movable along the transport path and that opens and closes the opening, and a transport body that is disposed in the transport path, that includes a blade formed in a spiral shape on an outer periphery of a shaft portion, and that transports the developer flowing into the transport path through the opening and moves the opening and closing portion to an opening position with the blade by rotating forward is conceivable.

In the transport device, the opening and closing portion may interfere with a nearby member disposed in the vicinity of the transport path in a case where the opening and closing portion moved toward the opening position rotates together with the transport body.

Aspects of non-limiting embodiments of the present disclosure relate to a transport device and an image forming apparatus that suppress interference between a nearby member disposed in the vicinity of a transport path and an opening and closing portion in comparison with a case where the opening and closing portion moved to an opening position rotates together with a transport body.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a transport device including a transport path that includes an opening through which a developer flows into the transport path, an opening and closing portion that is provided to be movable along the transport path and that opens and closes the opening, and a transport body that is disposed in the transport path, that includes a blade formed in a spiral shape on an outer periphery of a shaft portion, that transports the developer flowing into the transport path through the opening and moves the opening and closing portion to an opening position with the blade by rotating forward, and that idly rotates with respect to the opening and closing portion moved to the opening position in a case of forward rotation.

BRIEF DESCRIPTION OF THE DRAWINGS

Exemplary embodiment(s) of the present invention will be described in detail based on the following figures, wherein.

DETAILED DESCRIPTION

An example of an exemplary embodiment according to the present invention will be described below with reference to the drawings.

Image Forming Apparatus 10

Figure 1:
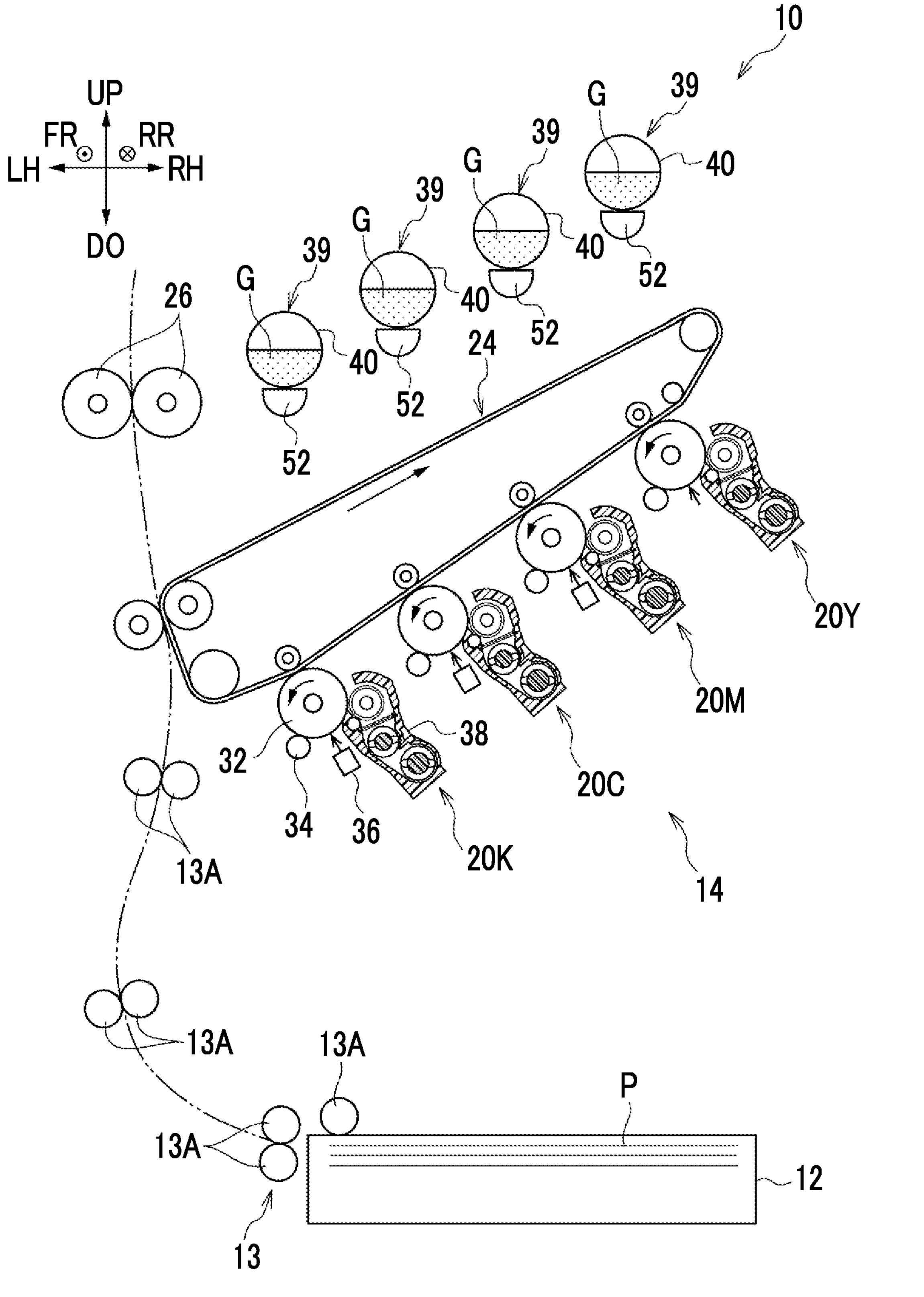
FIG. 1 is a view schematically showing an image forming apparatus according to the present exemplary embodiment.

The configuration of an image forming apparatus 10 according to the present exemplary embodiment will be described. FIG. 1 is a view schematically showing the configuration of the image forming apparatus 10 according to the present exemplary embodiment.

Note that an arrow UP shown in the drawing represents a direction to an upper side (more specifically, an upper side in a vertical direction) of the apparatus, and an arrow DO represents a direction to a lower side of the apparatus (specifically, a lower side in the vertical direction). In addition, an arrow LH shown in the drawing represents a direction to a left side of the apparatus and an arrow RH represents a direction to a right side of the apparatus. In addition, an arrow FR shown in the drawing represents a direction to a front side of the apparatus and an arrow RR represents a direction to a rear side of the apparatus. Since these directions are directions determined for the sake of convenience of description, the configuration of the apparatus is not limited by these directions. Note that regarding each of the directions related to the apparatus, the term "apparatus" may be omitted. That is, for example, "the upper side of the apparatus" may simply be described as "the upper side".

Also, in the following description, the term "vertical direction" may be used to mean "both of an upward direction and a downward direction" or "any one of the upward direction or the downward direction". A term "right-left direction" may be used to mean "both of a rightward direction and a leftward direction" or "any one of the rightward direction or the leftward direction". Note that the "right-left direction" may also be referred to as a lateral direction, a transverse direction, and a horizontal direction. A term "front-rear direction" may be used to mean "both of a forward direction and a rearward direction" or "any one of the forward direction or the rearward direction". Note that the "front-rear direction" may also be referred to as a lateral direction, a transverse direction, and a horizontal direction. In addition, the vertical direction, the right-left direction, and the front-rear direction are directions that intersect each other (specifically, directions orthogonal to each other).

In addition, a symbol in which "x" is in "o" in the drawings means an arrow from the front to the back of the paper surface. In addition, a symbol in which "•" is in "o" in the drawings means an arrow from the back to the front of the paper surface.

The image forming apparatus 10 shown in FIG. 1 is an apparatus that forms an image. Specifically, as shown in FIG. 1, the image forming apparatus 10 includes a medium accommodation portion 12, a transport unit 13, an image forming unit 14, and developer transport devices 39. Hereinafter, each part of the image forming apparatus 10 will be described.

Medium Accommodation Portion 12 and Transport Unit 13

The medium accommodation portion 12 is a portion that accommodates a recording medium P in the image forming apparatus 10. The recording medium P accommodated in the medium accommodation portion 12 is supplied to the image forming unit 14. The recording medium P accommodated in the medium accommodation portion 12 is an object on which an image is formed by the image forming unit 14. Examples of the recording medium P include a paper sheet and a film. Examples of the film include a resin film and a metal film. Note that the recording medium P is not limited to the mediums described above, and various recording mediums can be used.

The transport unit 13 transports, to a discharge portion (not shown), the recording medium P accommodated in the medium accommodation portion 12. Specifically, as shown in FIG. 1, the transport unit 13 includes transport members 13A such as a plurality of transport rollers and transports the recording medium P by means of the transport members 13A. Note that, the transport member 13A may be, for example, a transport member such as a transport belt and a transport drum and various transport members may be used as the transport member 13A.

Image Forming Unit 14

The image forming unit 14 is a component that forms an image on the recording medium P by using developers G transported by the developer transport devices 39. Specifically, the image forming unit 14 forms, by means of electrophotography, a toner image (an example of an image) on the recording medium P transported by the transport unit 13 (specifically, the transport members 13A). More specifically, the image forming unit 14 includes toner image forming units 20Y, 20M, 20C, and 20K (hereinafter, 20Y to 20K), a transfer body 24, and a fixing unit 26.

Each of the toner image forming units 20Y to 20K includes a photoreceptor 32. Since the toner image forming units 20Y to 20K are configured in the same manner, reference numerals for each part of the toner image forming units 20Y, 20M, and 20C are omitted in FIG. 1.

The photoreceptor 32 is an example of a holder, and is a structure that holds a latent image. Specifically, the photoreceptor 32 rotates in one direction (for example, a counterclockwise direction in FIG. 1). In the vicinity of the photoreceptor 32, a charging device 34, an exposure device 36, and a development device 38 are provided in this order from an upstream side in the direction of rotation of the photoreceptor 32.

In each of the toner image forming units 20Y to 20K, the charging device 34 charges the photoreceptor 32 (a charging step). Furthermore, the exposure device 36 exposes the photoreceptor 32 charged by the charging device 34 to light so that a latent image (specifically, an electrostatic latent image) is formed on the photoreceptor 32 (an exposure step). The photoreceptor 32 holds the latent image formed by exposure device 36. Then, the development device 38 develops the latent image held by the photoreceptor 32 by using the developer G (a development step). Accordingly, a toner image is formed on the photoreceptor 32. As the developer G, for example, a developer containing toner and a magnetic carrier is used.

In the image forming unit 14, the toner image forming units 20Y to 20K perform the charging step, the exposure step, and the development step to form toner images of respective colors which are yellow (Y), magenta (M), cyan (C), and black (K) on the transfer body 24. Furthermore, in the image forming unit 14, the toner images of the respective colors that are formed on the transfer body 24 are transferred to the recording medium P and the toner images are fixed onto the recording medium P by the fixing unit 26. As described above, the image forming unit 14 uses an intermediate transfer method in which an image is transferred to the recording medium P via the transfer body 24.

Note that, as the image forming unit, a direct transfer type image forming unit in which an image is directly transferred to the recording medium P may also be used instead of an intermediate transfer type image forming unit and various image forming units can also be applied.

Developer Transport Device 39

The developer transport devices 39 shown in FIG. 1 are devices that transport the developers G (specifically, toner) toward the image forming unit 14 (specifically, the development device 38). Four developer transport devices 39 are provided to correspond to the toner image forming units 20Y to 20K, respectively. The developer transport devices 39 transport the developers G of yellow (Y), magenta (M), cyan (C), and black (K), respectively.

Note that FIG. 1 shows a part of a transportation path through which the developers G are transported to the image forming unit 14 by the developer transport devices 39 and the other part of the transportation path is not shown. In the present exemplary embodiment, each of the developer transport devices 39 includes a developer accommodation portion 40, a transport path 52, an opening and closing portion 60, and a transport body 70, as shown in FIG. 2.

Developer Accommodation Portion 40

Figure 2:
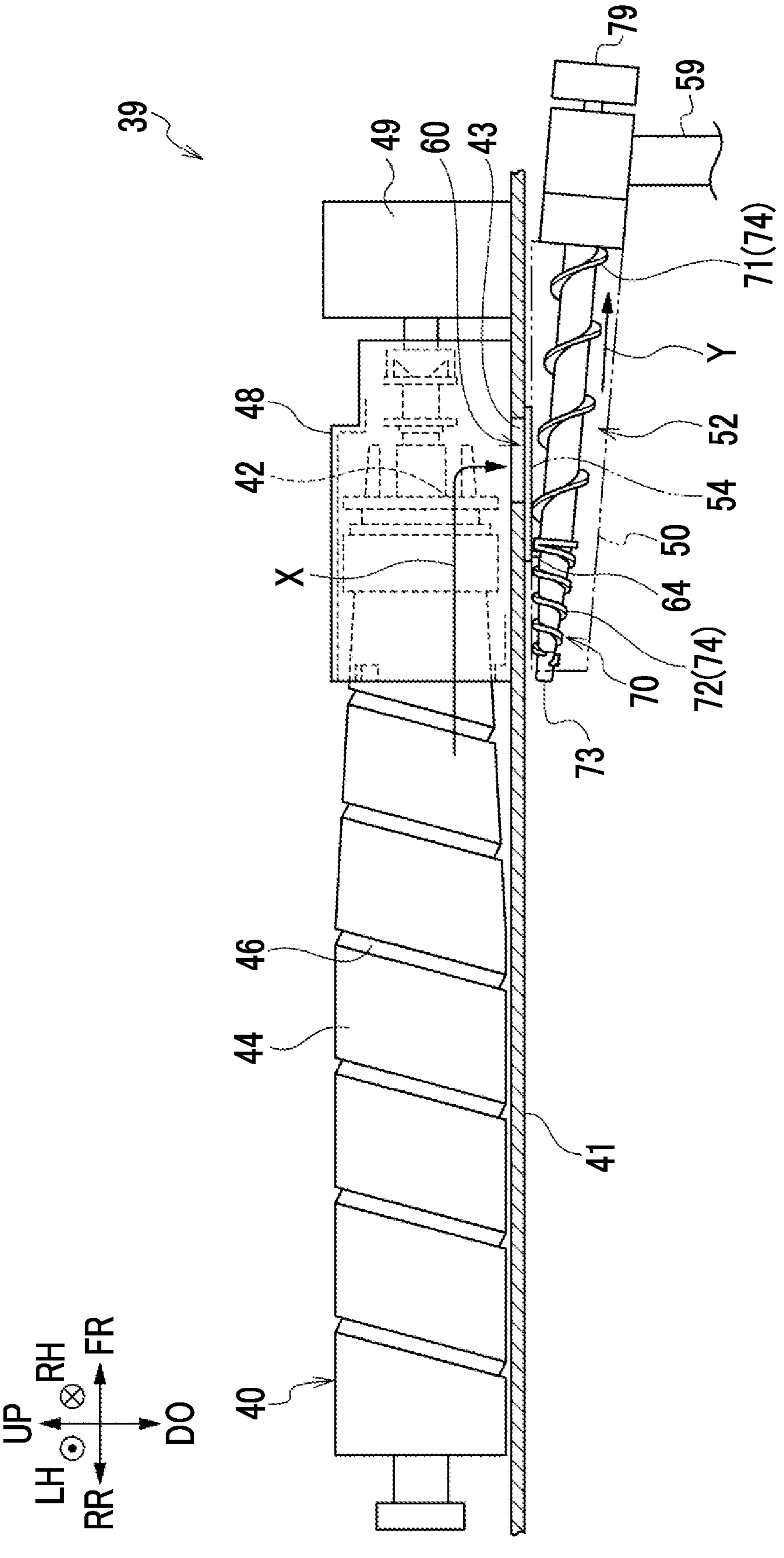
FIG. 2 is a side view showing a developer transport device according to the present exemplary embodiment.

The developer accommodation portion 40 shown in FIGS. 1 and 2 is an example of an accommodation portion and is a component that accommodates the developer G (specifically, toner) to be transported toward the image forming unit 14 (specifically, the development device 38). As shown in FIG. 2, the developer accommodation portion 40 is formed in a cylindrical shape extending along one direction and accommodates the developer G that flows into the transport path 52 through an opening 54 which will be described later. Specifically, the developer accommodation portion 40 is formed in a cylindrical shape of which an axial direction is the front-rear direction. More specifically, the developer accommodation portion 40 is composed of a bottomed container of which a rear side is closed and a front side is open and that includes an opening portion 42, and the diameter of a front side of the developer accommodation portion 40 gradually decreases frontward.

In the present exemplary embodiment, the developer accommodation portion 40 is mounted on a mount portion 41. The mount portion 41 is, for example, formed in a plate-like shape that is semicircular while being open upward as seen in the front-rear direction. A discharge port 43, through which the developer G transported from the developer accommodation portion 40 is discharged, is formed in the mount portion 41. In addition, in FIG. 2, a part of the mount portion 41 is shown.

A front end portion of the developer accommodation portion 40 is rotatably supported by a support portion 48 that has a cylindrical shape. A guide portion 46 that has a spiral shape and protrudes toward an inner side of a circumferential wall 44 of the developer accommodation portion 40 is formed on the circumferential wall 44. The developer accommodation portion 40 rotates by means of a driving force from a driving unit 49 so that the developer G accommodated therein is transported to the opening portion 42 by the guide portion 46 as represented by an arrow X. The developer G transported to the opening portion 42 is discharged toward the transport path 52 through the opening portion 42 and the discharge port 43.

Transport Path 52

The transport path 52 shown in FIGS. 2, 3, 4, and 5 is a path through which the developer G is transported. The transport path 52 includes the opening 54 through which the developer G flows in. The opening 54 is disposed at an upper portion of the transport path 52, and the developer G discharged from the discharge port 43 passes through the opening 54 and flows into the transport path 52 in a state where the opening and closing portion 60 is at an opening position (a position shown in FIG. 3).

Figure 3:
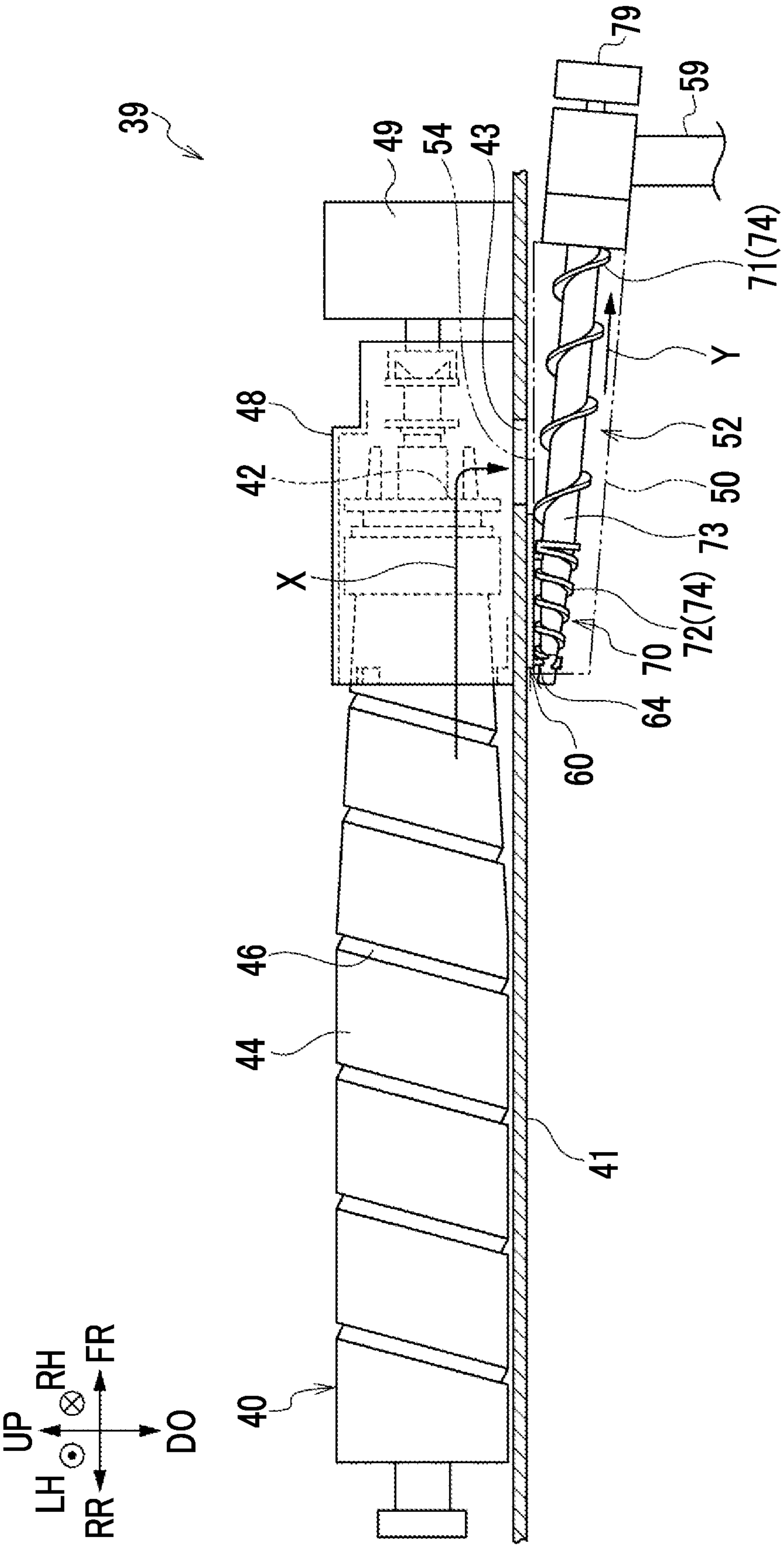
FIG. 3 is a side view showing a state where an opening and closing portion is open in a configuration shown in FIG. 2.

The transport path 52 extends forward. In the transport path 52, as shown in FIGS. 2 and 3, the developer G flowing into the transport path 52 through the opening 54 is transported by the transport body 70 in a transport direction (specifically, a forward direction (refer to a direction along an arrow Y in FIGS. 2 and 3)) set in advance. Specifically, the transport path 52 is formed inside a transport pipe 50.

The transport path 52 is inclined with respect to the axial direction of the developer accommodation portion 40 as seen in a side view such that the transport path 52 is close to the developer accommodation portion 40 on a side to which an opposite direction (specifically, a rearward direction) to the transport direction (specifically, a frontward direction) extends, the transport direction being a direction in which the transport body 70 transports the developer G. In the present exemplary embodiment, the transport path 52 is inclined such that the height thereof decreases toward a side to which the transport direction (specifically, the frontward direction) extends.

Figure 4:
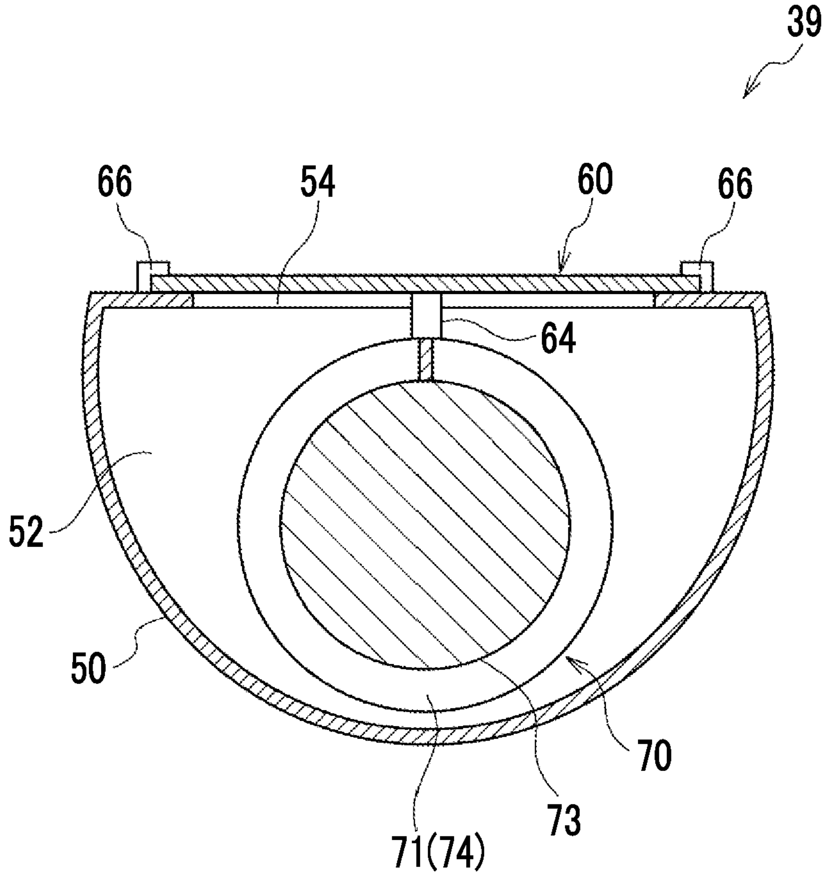
FIG. 4 is a front cross-sectional view showing a transport path, a transport body, and the like according to the present exemplary embodiment.

In addition, the path width of the transport path 52 decreases toward the side to which the opposite direction (specifically, the rearward direction) extends. In the present exemplary embodiment, as shown in FIG. 4, the transport path 52 is formed to have a substantially semicircular sectional shape of which a portion on the developer accommodation portion 40 side (specifically, the upper side) is a flat surface including the opening 54.

Note that, as shown in FIGS. 2 and 3, the transport path 52 is connected to another transport path 59 on a downstream side and the developer G transported through the transport path 52 is transported toward the image forming unit 14 through the transport path 59.

Opening and Closing Portion 60

The opening and closing portion 60 shown in FIGS. 2, 3, 4, and 5 is a component that opens and closes the opening 54. The opening and closing portion 60 is provided to be movable along the transport path 52. In the present exemplary embodiment, the opening and closing portion 60 is attached to an attachment portion 66 such that the opening and closing portion 60 is movable in the front-rear direction. The attachment portion 66 functions as a guide portion that guides the opening and closing portion 60 in a direction set in advance along the transport path 52.

Specifically, the opening and closing portion 60 is movable between the opening position (a position shown in FIGS. 3, 7, and 8) at which the opening 54 is open with respect to the discharge port 43 and a closing position (a position shown in FIGS. 2, 5, 6, and 9) at which the opening 54 is closed with respect to the discharge port 43.

The opening and closing portion 60 is formed in a plate-like shape as shown in FIGS. 2, 3, and 4. Specifically, the opening and closing portion 60 is formed as a flat plate of which a thickness direction is the vertical direction. The opening and closing portion 60 includes a shaft portion 64 that is able to come into contact with the transport body 70. The shaft portion 64 is an example of a contact portion.

The shaft portion 64 is provided to protrude downward from a rear portion of the opening and closing portion 60. A tip end portion (that is, a lower end portion) of the shaft portion 64 extends from the rear portion of the opening and closing portion 60 to reach a position at which the tip end portion is able to come into contact with a blade 74 of the transport body 70, which will be described later. Specifically, the shaft portion 64 is able to come into contact with a first surface 72A of the blade 74 of the transport body 70 and a second surface 72B opposite to the first surface 72A.

Figure 5:
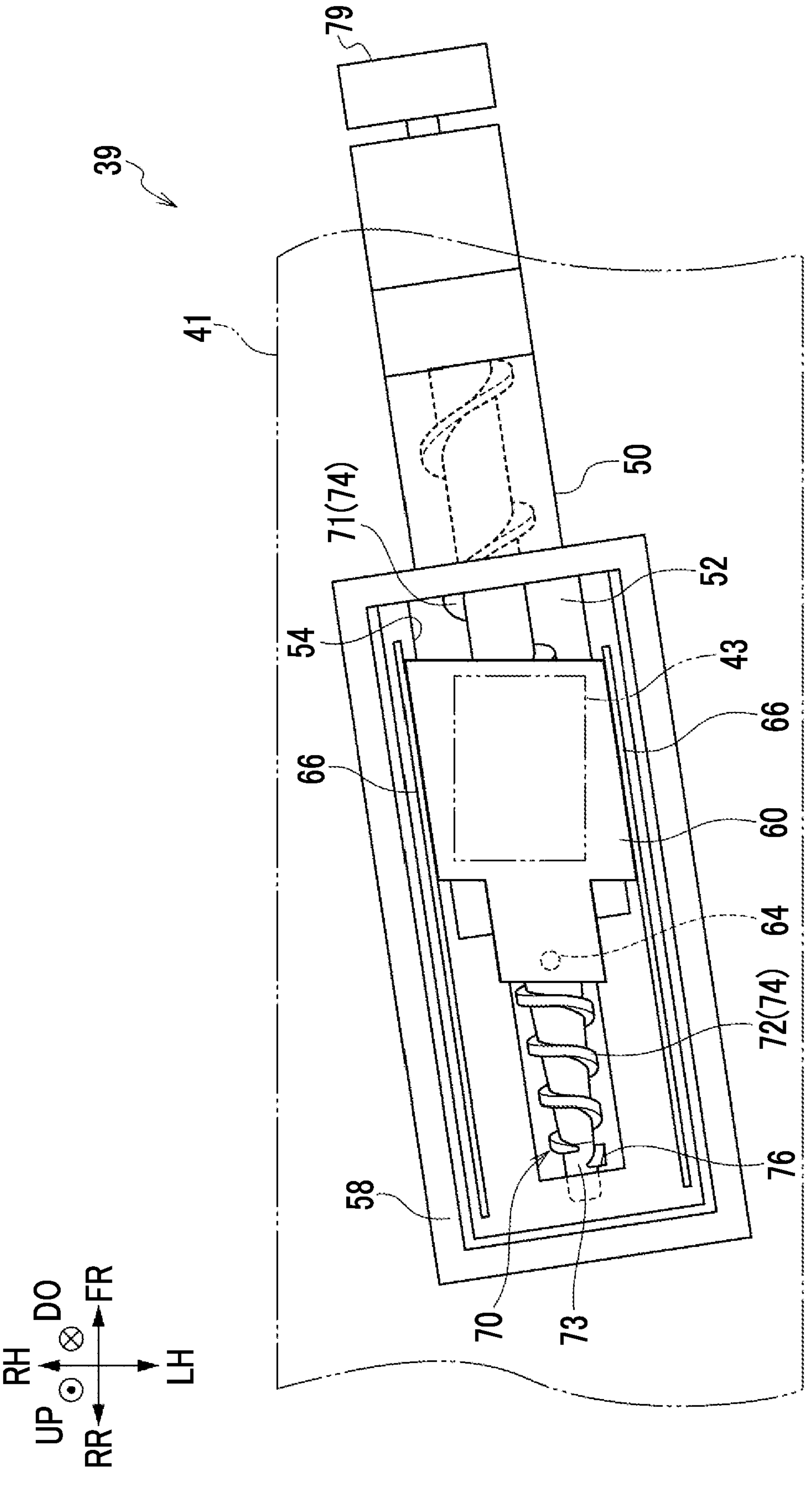
FIG. 5 is a plan view showing the transport path, the transport body, the opening and closing portion, and the like according to the present exemplary embodiment.

Note that, in the present exemplary embodiment, as shown in FIG. 5, a frame-shaped sealing material 58 that surrounds the opening and closing portion 60, the opening 54, and the discharge port 43 is provided between the mount portion 41 and the transport path 52 (that is, the transport pipe 50). Since the sealing material 58 surrounds the opening and closing portion 60, the opening 54, and the discharge port 43, leakage of the developer G is suppressed.

Transport Body 70

The transport body 70 shown in FIGS. 2, 3, 4, and 5 is a structure that transports the developer G. The transport body 70 is disposed in the transport path 52, includes the blade 74 formed in a spiral shape on an outer periphery of a shaft portion 73, and transports the developer G flowing into the transport path 52 through the opening 54 by rotating forward (rotation in a direction along an arrow M in FIG. 6). Furthermore, the transport body 70 moves the opening and closing portion 60 to the opening position (the position shown in FIGS. 3, 7, and 8) with the blade 74 by rotating forward (rotation in the direction along the arrow M in FIG. 6).

Figure 6:
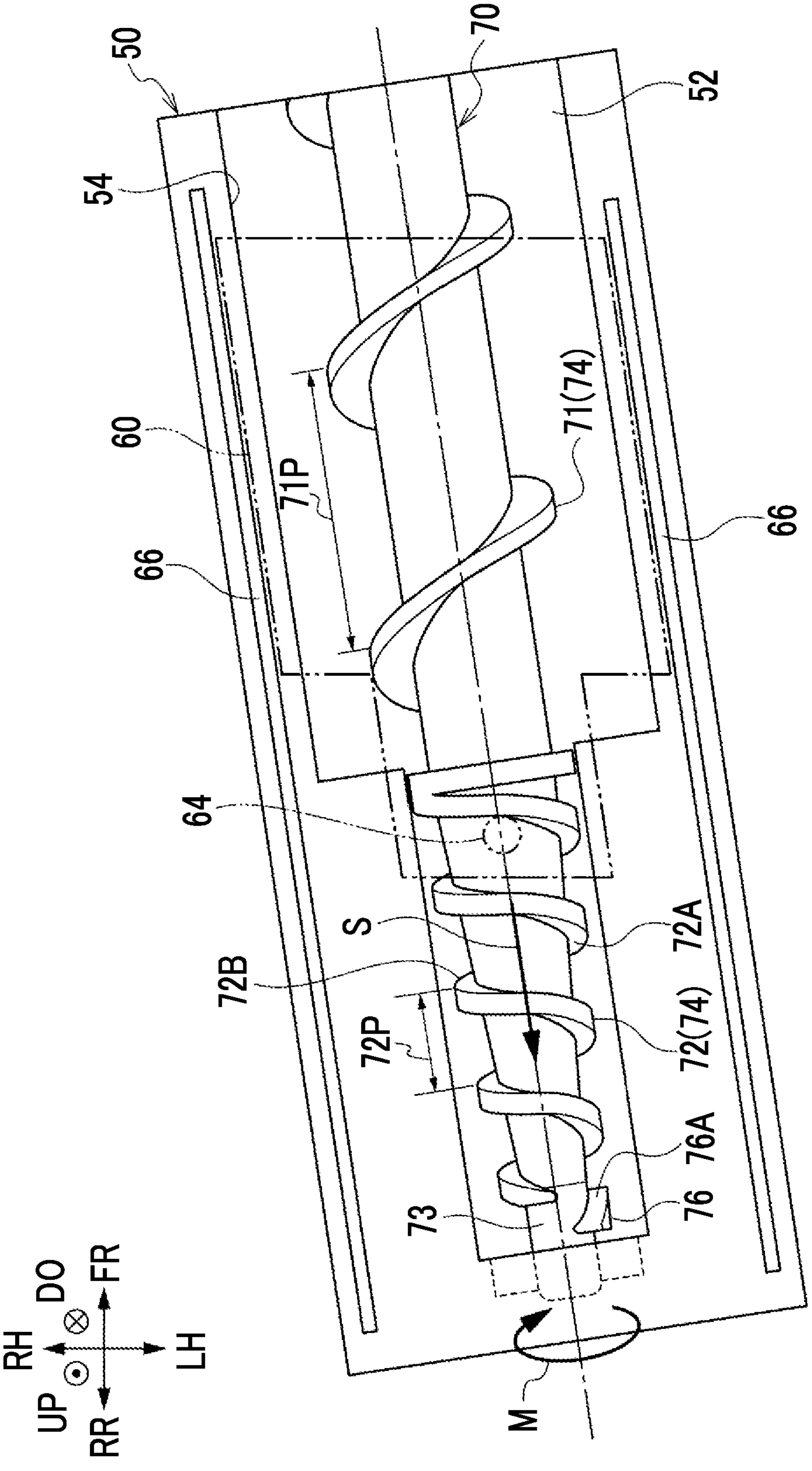
FIG. 6 is a plan view showing the operation of the transport body and the opening and closing portion in the case of movement of the opening and closing portion to an opening position.

Specifically, as shown in FIGS. 2, 5, and 6, the transport body 70 includes the shaft portion 73 extending in one direction. Furthermore, the transport body 70 includes, as the blade 74, a first blade 71 that is formed on the shaft portion 73 and that moves the developer G in the transport direction (specifically, the forward direction), and a second blade 72 that is formed on the shaft portion 73, that moves the opening and closing portion 60 to the opening position in the opposite direction (specifically, the rearward direction), and that is formed to be wound in a direction opposite to a direction in which the first blade 71 is wound.

The outer diameter of a portion of the shaft portion 73, on which the second blade 72 is formed, decreases toward the side to which the opposite direction (specifically, the rearward direction) extends. That is, the portion of the shaft portion 73, on which the second blade 72 is formed, is formed in a truncated cone shape. Therefore, the outer diameter of the second blade 72 decreases toward the side to which the opposite direction (specifically, the rearward direction) extends. As a result, the outer diameter of the entire transport body 70 decreases toward the side to which the opposite direction (specifically, the rearward direction) extends. In the present exemplary embodiment, a radial dimension of a blade part (a portion projecting radially outward from the shaft portion 73) of the second blade 72 is constant along an axial direction of the shaft portion 73. Note that the radial dimension of the blade part (the portion projecting radially outward from the shaft portion 73) may decrease toward the side to which the opposite direction (specifically, the rearward direction) extends.

Figure 7:
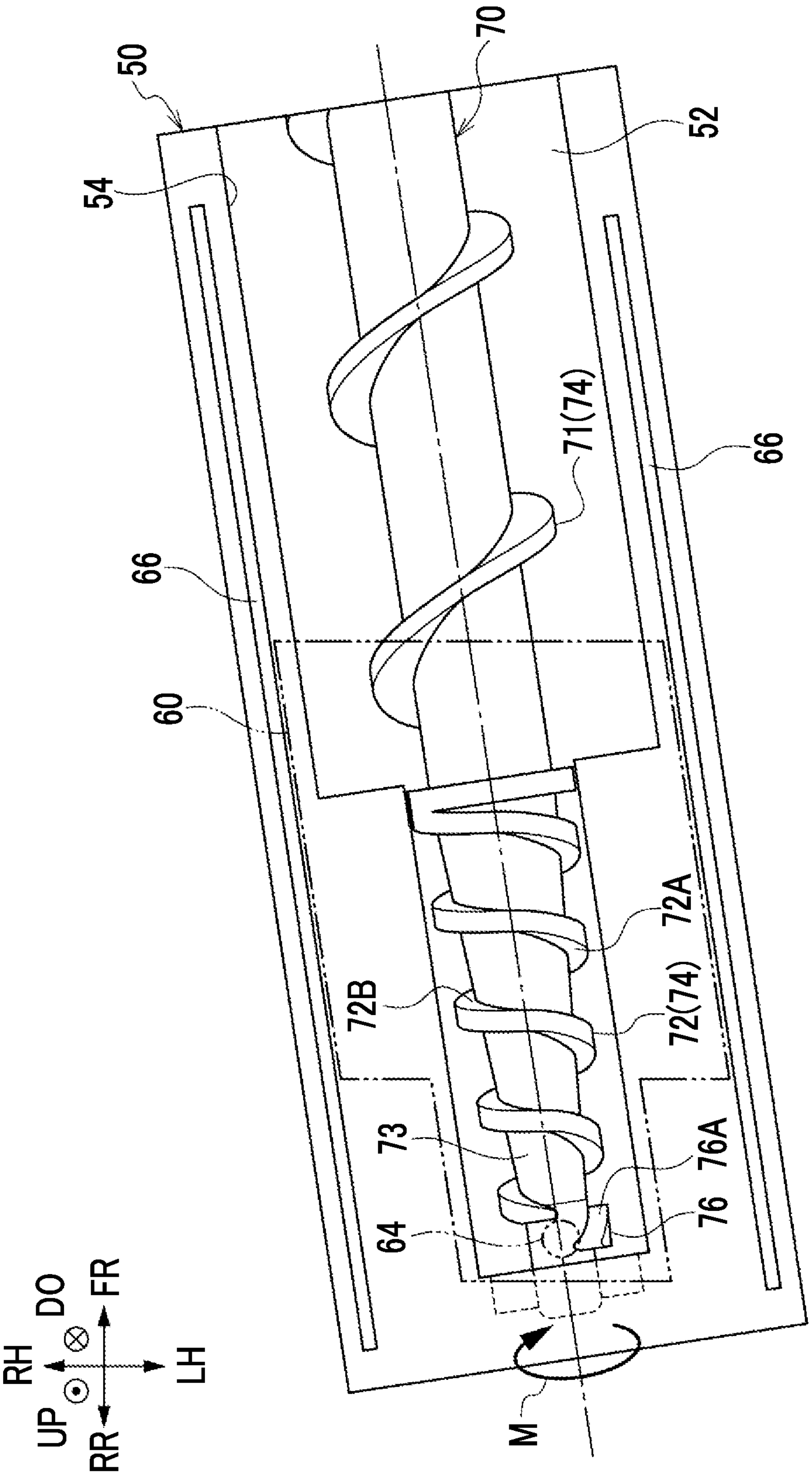
FIG. 7 is a plan view showing a state where the opening and closing portion has been moved to the opening position in a configuration shown in FIG. 6.

As shown in FIGS. 6 and 7, the second blade 72 includes the first surface 72A and the second surface 72B opposite to the first surface 72A. The first surface 72A is a surface that faces the rear side, and is a contact surface that comes into contact with the shaft portion 64 in a case where the opening and closing portion 60 is moved to an opening position side from a closing position side. The second surface 72B is a surface that faces the front side and is a contact surface that comes into contact with the shaft portion 64 in a case where the opening and closing portion 60 is moved to the closing position side from the opening position side.

In the present exemplary embodiment, in a case where the transport body 70 rotates forward (rotation in the direction along the arrow M in FIGS. 6 and 7) with a driving force from a driving unit 79, the first surface 72A of the second blade 72 comes into contact with the shaft portion 64 and the opening and closing portion 60 is moved in a movement direction (a direction along an arrow S in FIG. 6) from the closing position (a position shown in FIG. 6) to the opening position (the position shown in FIG. 7).

Figure 8:
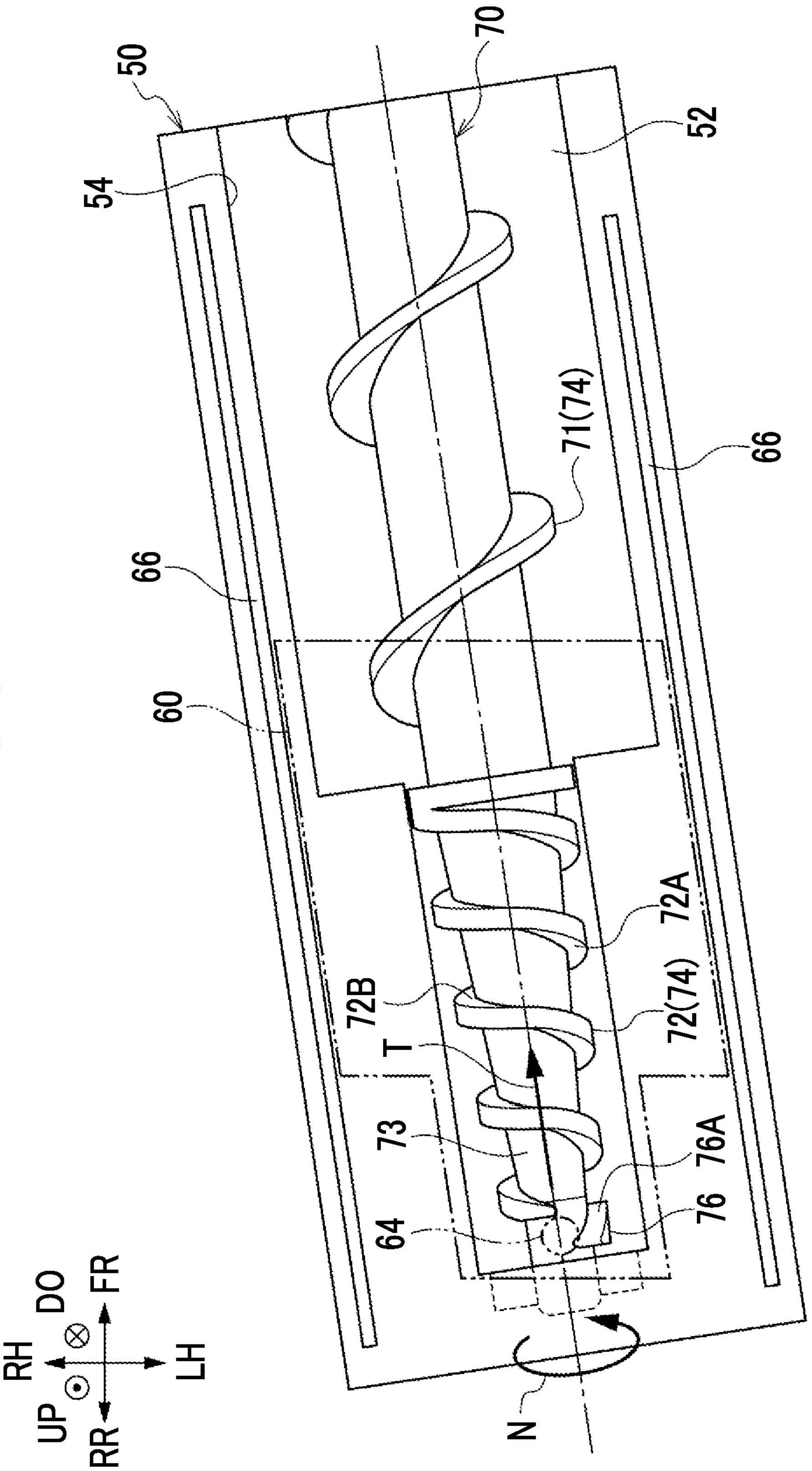
FIG. 8 is a plan view showing the operation of the transport body and the opening and closing portion in the case of movement of the opening and closing portion to a closing position.
Figure 9:
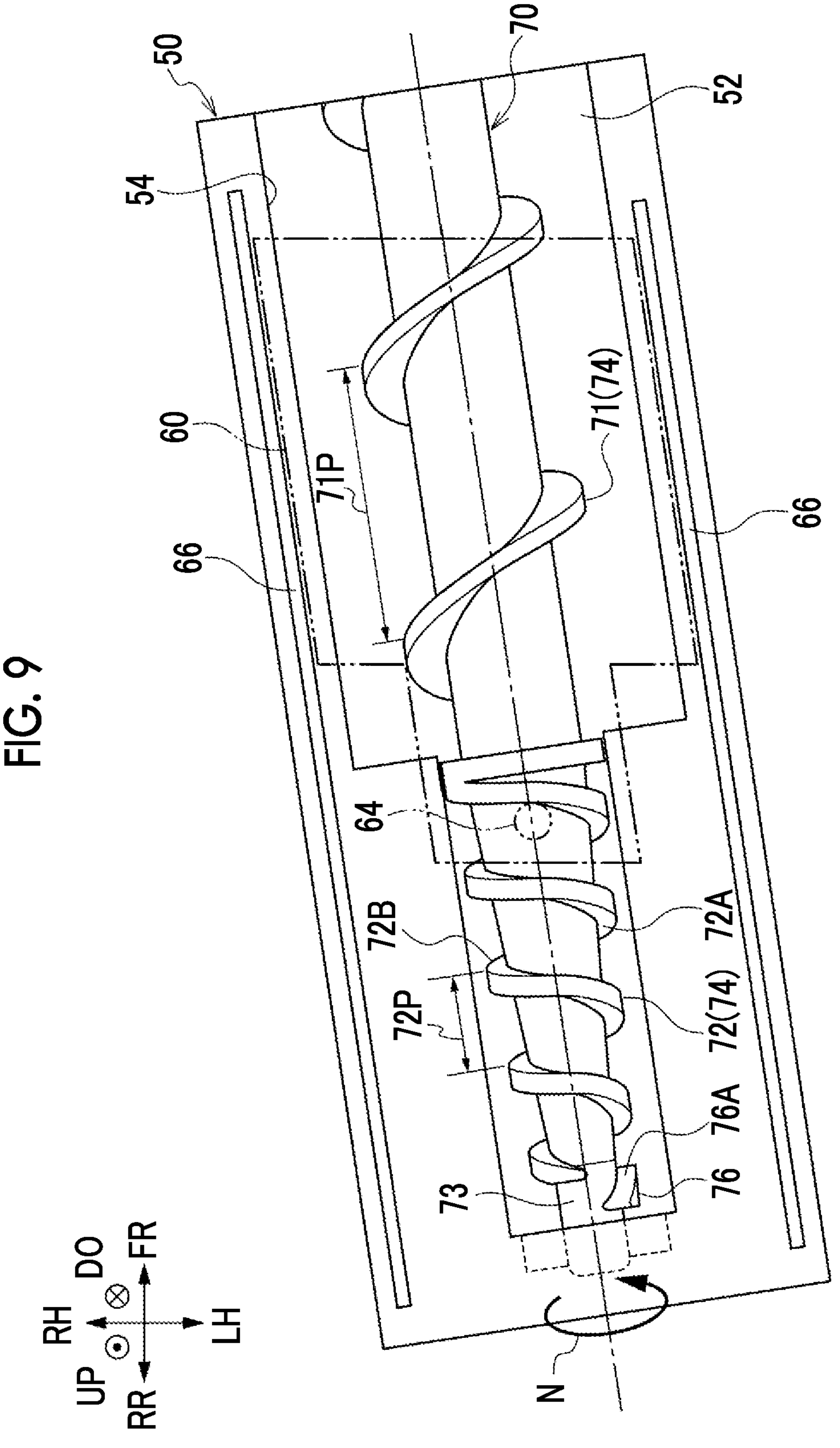
FIG. 9 is a plan view showing a state where the opening and closing portion has been moved to the closing position in a configuration shown in FIG. 8.

In a case where the transport body 70 rotates backward (rotation in a direction along an arrow N in FIGS. 8 and 9) by a driving force from the driving unit 79, the second surface 72B of the second blade 72 comes into contact with the shaft portion 64 and the opening and closing portion 60 is moved in a movement direction (a direction along an arrow T in FIG. 8) from the opening position (the position shown in FIG. 8) to the closing position (the position shown in FIG. 9).

A spiral interval 72P (refer to FIG. 6) of the second blade 72 is smaller than a spiral interval 71P (refer to FIG. 6) of the first blade 71. Each of the spiral intervals 72P and 71P refers to the axial length of the blade 74 per 360 degrees (one cycle) in a circumferential direction of the shaft portion 73.

Note that, regarding the transport body 70, an annular portion 78 formed in an annular shape along a circumferential direction of the shaft portion 73 is formed at an end portion of the second blade 72 that is on a side to which the direction along the arrow T extends.

Figure 10:
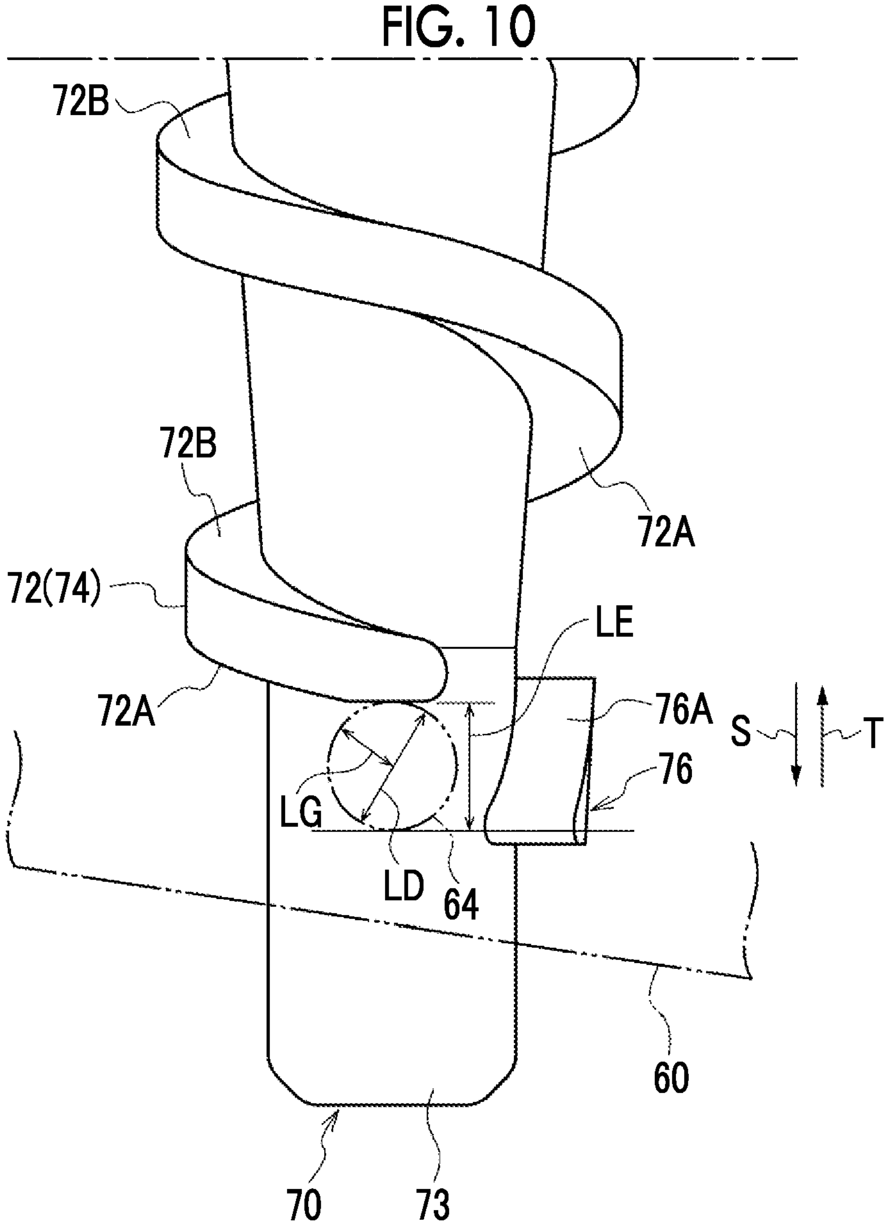
FIG. 10 is a schematic view showing a rear end portion of the transport body according to the present exemplary embodiment.
Figure 11:
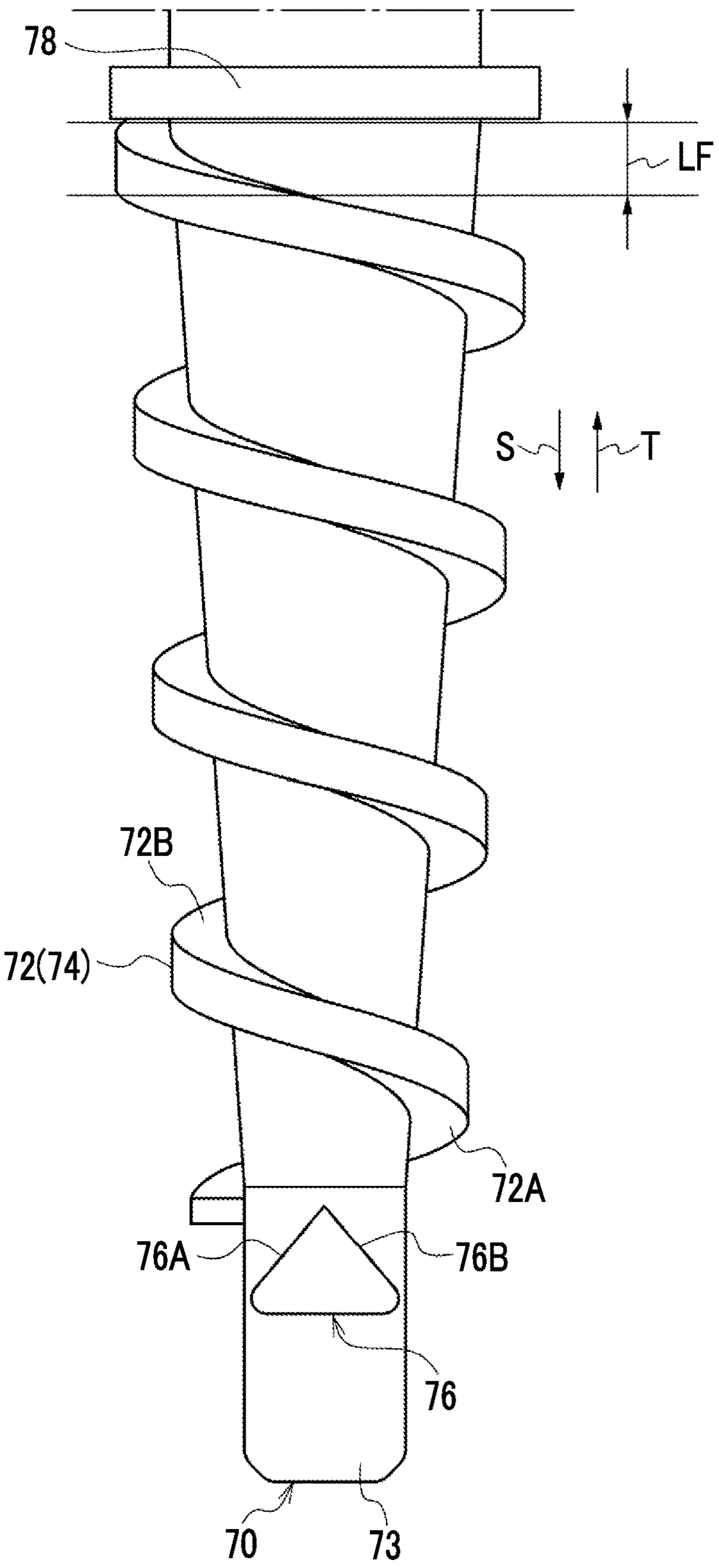
FIG. 11 is a schematic view showing a movement portion and an annular portion provided on the transport body according to the present exemplary embodiment.

In addition, as shown in FIGS. 10 and 11, the transport body 70 includes a movement portion 76 that is formed on the shaft portion 73 and that moves the shaft portion 64 of the opening and closing portion 60 positioned at the opening position to a position at which the shaft portion 64 comes into contact with the second surface 72B of the second blade 72.

Figure 12:
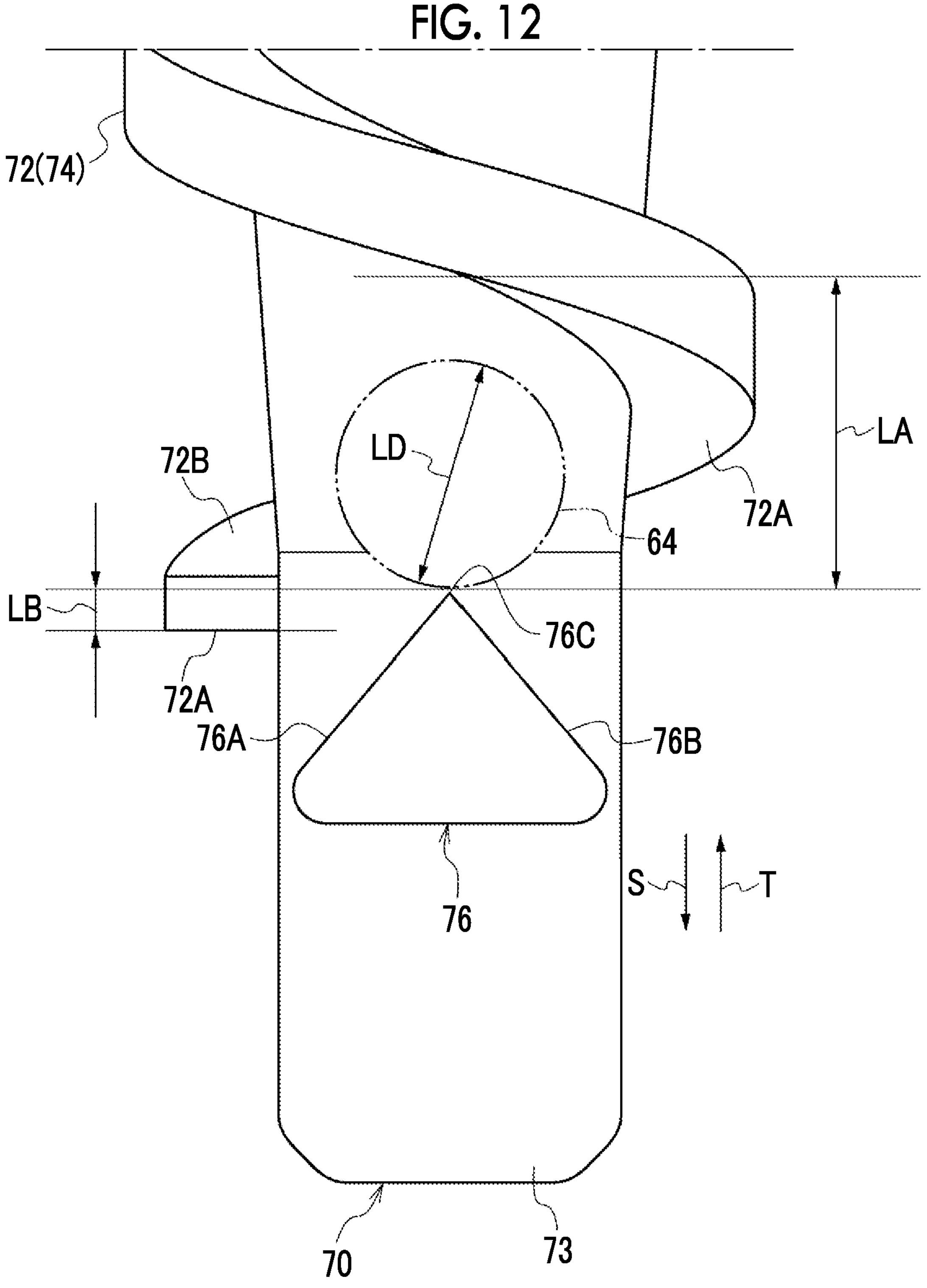
FIG. 12 is a schematic view showing a positional relationship between the movement portion and each part of a second blade according to the present exemplary embodiment.

As shown in FIGS. 11 and 12, the movement portion 76 is formed to be substantially triangular as seen from an outer side in a radial direction of the shaft portion 64. The movement portion 76 includes a first contact surface 76A that comes into contact in the case of forward rotation of the shaft portion 64 and a second contact surface 76B that comes into contact in the case of backward rotation of the shaft portion 64.

In the present exemplary embodiment, in a case where the transport body 70 rotates backward (rotation in the direction along the arrow N in FIGS. 8 and 9) with a driving force from the driving unit 79, the second surface 72B comes into contact with the shaft portion 64 and the opening and closing portion 60 is moved in a reverse direction (the direction along the arrow T in FIG. 8) from the opening position to the closing position after the movement portion 76 (specifically, the second contact surface 76B) moves the shaft portion 64 of the opening and closing portion 60 positioned at the opening position to the position at which the shaft portion 64 comes into contact with the second surface 72B of the second blade 72.

In other words, the second contact surface 76B is a guide surface that comes into contact with the shaft portion 64 to guide the shaft portion 64 in the direction along the arrow T to the position at which the shaft portion 64 comes into contact with the second surface 72B in the case of the backward rotation of the transport body 70.

In addition, in the present exemplary embodiment, the transport body 70 rotating forward idly rotates with respect to the opening and closing portion 60 (specifically, the shaft portion 64) moved to the opening position. Note that idle rotation refers to a state where rotation of the transport body 70 is not hindered by the shaft portion 64 and the transport body 70 rotates relative to the opening and closing portion 60 and a state where the transport body 70 does not integrally rotate with the opening and closing portion 60.

In the present exemplary embodiment, in a case where the transport body 70 rotates forward, the first contact surface 76A of the movement portion 76 comes into contact with the shaft portion 64 and the opening and closing portion 60 is moved in the reverse direction (the direction along the arrow T in FIG. 8). However, thereafter, the first surface 72A comes into contact with the shaft portion 64 and the opening and closing portion 60 is moved in the movement direction (the direction along the arrow S in FIG. 6).

That is, in a case where the transport body 70 rotates forward, the opening and closing portion 60 positioned at the opening position is moved in the reverse direction (the direction along the arrow T in FIG. 8) and the movement direction (the direction along the arrow S in FIG. 6) within a range corresponding to the axial length of the first contact surface 76A of the movement portion 76 each time the transport body 70 rotates once.

Furthermore, after the opening and closing portion 60 is positioned at the opening position, the opening and closing portion 60 is not moved in the axial direction by a distance corresponding to the spiral interval 72P and the transport body 70 rotates relative to the opening and closing portion 60 even in a case where the transport body 70 rotates once in a forward rotation direction (the direction along the arrow M in FIG. 6).

In the present exemplary embodiment, as shown in FIG. 12, LA>LD, where LA is an interval between the movement portion 76 and the first surface 72A that is disposed, with respect to the movement portion 76, on a side to which the reverse direction (the direction along the arrow T in FIG. 12) extends and LD is a dimension (specifically, the diameter) of the shaft portion 64 in the reverse direction.

In other words, in a case where the transport body 70 rotates forward, the shaft portion 64 can pass through a space between the movement portion 76 and the first surface 72A in a state of being separated from at least one of the movement portion 76 or the first surface 72A.

In addition, as shown in FIG. 10, LE>LG, where LE is a distance between a portion of the first surface 72A of the second blade 72 that is closest to a side to which the direction along the arrow S extends and a portion of the second contact surface 76B of the movement portion 76 that is closest to the side to which the direction along the arrow S extends, LG is the radius of the shaft portion 64, and LD is the diameter of the shaft portion 64. It is desirable that, for example, LE>LG.

In other words, the second contact surface 76B of the movement portion 76 is formed at a position at which the second contact surface 76B can guide, to the side to which the direction along the arrow T extends, the shaft portion 64 moved in the direction along the arrow S by the first surface 72A of the second blade 72 in a case where the shaft portion 64 rotates backward.

In addition, as shown in FIG. 12, LB>0, where LB is a distance between a top point 76C (that is, a portion of the movement portion 76 that is closest to the side to which the direction along the arrow T extends) of the movement portion 76 and the portion of the first surface 72A of the second blade 72 that is closest to the side to which the direction along the arrow S extends.

Figure 13:
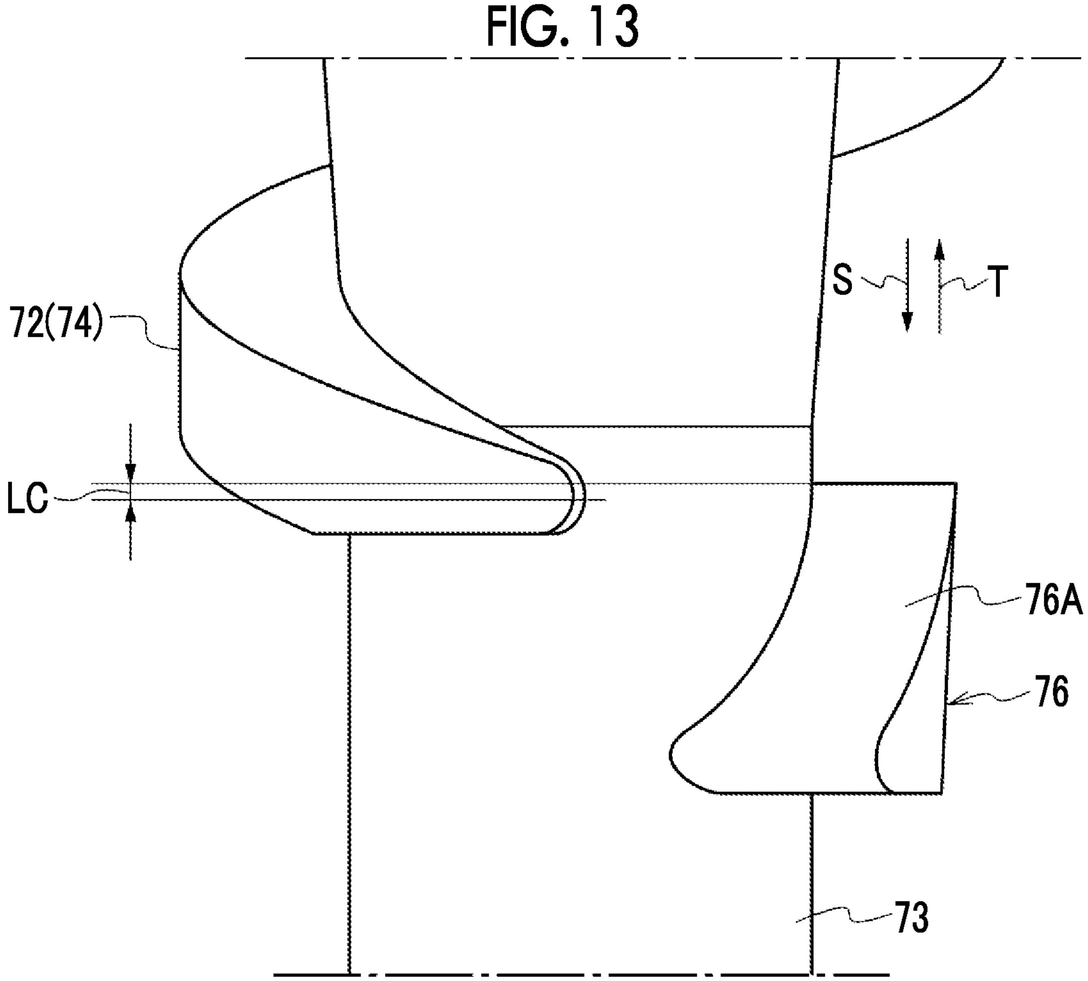
FIG. 13 is a schematic view showing a positional relationship between the movement portion and a second surface of the second blade according to the present exemplary embodiment.

In addition, as shown in FIG. 13, LC>0, where LC is a distance between the top point 76C (that is, the portion of the movement portion 76 that is closest to the side to which the direction along the arrow T extends) of the movement portion 76 and a portion of the second surface 72B of the second blade 72 that is closest to the side to which the direction along the arrow S extends.

In other words, the top point 76C of the movement portion 76 is positioned closer to the side to which the direction along the arrow T extends than the first surface 72A and the second surface 72B of the second blade 72. Furthermore, the movement portion 76 can move the shaft portion 64 to a position on the side to which the direction along the arrow T extends with respect to the first surface 72A and the second surface 72B of the second blade 72.

In addition, as shown in FIG. 11, LF<LD, where LF is a distance between a portion of the second surface 72B of the second blade 72 that is closest to the side to which the direction along the arrow T extends and the annular portion 78 and LD is the diameter of the shaft portion 64.

In other words, in a case where the shaft portion 64 is moved by the second surface 72B of the second blade 72 to the annular portion 78 in the direction along the arrow T in the case of backward rotation of the shaft portion 64, the shaft portion 64 is interposed between the annular portion 78 and the second surface 72B and movement of the shaft portion 64 in the circumferential direction and the direction along the arrow T is restricted.

Action of Present Exemplary Embodiment

In the present exemplary embodiment, the transport body 70 moves the opening and closing portion 60 to the opening position (the position shown in FIGS. 3, 7, and 8) with the blade 74 (specifically, the second blade 72) by rotating forward (rotation in the direction along the arrow M in FIG. 6) and the transport body 70 rotating forward idly rotates with respect to the opening and closing portion 60 (specifically, the shaft portion 64) moved to the opening position.

Therefore, displacement of the position of the opening and closing portion 60 is small in comparison with a case where the opening and closing portion 60 moved to the opening position rotates together with the transport body 70 and thus interference between a nearby member disposed in the vicinity of the transport path 52 and the opening and closing portion 60 is suppressed.

As a result, the image forming apparatus 10 with a high degree of freedom in disposing members in the vicinity of the transport path 52 in comparison with a case where the opening and closing portion 60 moved to the opening position rotates together with the transport body 70 may be provided.

In addition, in the present exemplary embodiment, in a case where the transport body 70 rotates backward (rotation in the direction along the arrow N in FIGS. 8 and 9) with a driving force from the driving unit 79, the second surface 72B comes into contact with the shaft portion 64 and the opening and closing portion 60 is moved in the reverse direction (the direction along the arrow T in FIG. 8) from the opening position to the closing position after the movement portion 76 (specifically, the second contact surface 76B) moves the shaft portion 64 of the opening and closing portion 60 positioned at the opening position to the position at which the shaft portion 64 comes into contact with the second surface 72B of the second blade 72.

Therefore, the number of components is reduced in comparison with a case where the opening and closing portion 60 is moved to the closing position by a component other than the transport body 70.

In addition, in the present exemplary embodiment, LA>LD, where LA is an interval between the movement portion 76 and the first surface 72A that is disposed, with respect to the movement portion 76, on a side to which the reverse direction (the direction along the arrow T in FIG. 12) extends and LD is a dimension (specifically, the diameter) of the shaft portion 64 in the reverse direction.

In other words, in a case where the transport body 70 rotates forward, the shaft portion 64 can pass through a space between the movement portion 76 and the first surface 72A in a state of being separated from at least one of the movement portion 76 or the first surface 72A. Therefore, the opening and closing portion 60 is restrained from rotating together with the transport body 70 in comparison with a case where LA=LD.

In addition, in the present exemplary embodiment, the transport path 52 is inclined with respect to the axial direction of the developer accommodation portion 40 as seen in a side view such that the transport path 52 is close to the developer accommodation portion 40 on a side to which the opposite direction (specifically, the rearward direction) to the transport direction (specifically, the frontward direction) extends, the transport direction being a direction in which the transport body 70 transports the developer G.

Therefore, a space for disposition of other components may be secured on a side that is opposite to the developer accommodation portion 40 with respect to a portion of the transport path 52 that is on a side to which the opposite direction extends, in comparison with a case where the transport path 52 is disposed to be parallel to the axial direction of the developer accommodation portion 40.

In addition, in the present exemplary embodiment, the path width of the transport path 52 decreases toward the side to which the opposite direction (specifically, the rearward direction) extends.

Therefore, space saving may be achieved in comparison with a case where the path width of the transport path 52 is constant in the opposite direction.

In the present exemplary embodiment, the outer diameter of the transport body 70 decreases toward the side to which the opposite direction (specifically, the rearward direction) extends.

Therefore, a difference between the path width of the transport path 52 and the outer diameter of the transport body 70 is made small in the opposite direction in comparison with a case where the outer diameter of the transport body 70 is constant in the opposite direction.

In the present exemplary embodiment, as shown in FIG. 4, the transport path 52 is formed to have a substantially semicircular sectional shape of which a portion on the developer accommodation portion 40 side (specifically, the upper side) is a flat surface including the opening 54 and the opening and closing portion 60 is formed as a flat plate.

Therefore, interference between the developer accommodation portion 40 and the opening and closing portion 60 is suppressed in comparison with a case where the opening and closing portion 60 is formed in a cylindrical shape.

In addition, in the present exemplary embodiment, the transport body 70 includes, as the blade 74, a first blade 71 that is formed on the shaft portion 73 and that moves the developer G in the transport direction (specifically, the forward direction), and a second blade 72 that is formed on the shaft portion 73, that moves the opening and closing portion 60 to the opening position in the opposite direction (specifically, the rearward direction), and that is formed to be wound in a direction opposite to a direction in which the first blade 71 is wound.

Therefore, the opening and closing portion 60 is less likely to hinder transportation of the developer G in comparison with a case where the opening and closing portion 60 is moved to the opening position by the first blade 71.

In addition, in the present exemplary embodiment, the outer diameter of the second blade 72 decreases toward the side to which the opposite direction (specifically, the rearward direction) extends.

Therefore, space saving may be achieved in comparison with a case where the second blade 72 has the same outer diameter as the first blade 71 and the outer diameter of the second blade 72 is constant.

In addition, in the present exemplary embodiment, the spiral interval 72P (refer to FIG. 6) of the second blade 72 is smaller than the spiral interval 71P (refer to FIG. 6) of the first blade 71.

Therefore, the movement speed of the opening and closing portion 60 is decreased in comparison with a case where the spiral interval 72P (refer to FIG. 6) of the second blade 72 is the same as the spiral interval 71P (refer to FIG. 6) of the first blade 71.

Modification Examples

In the present exemplary embodiment, in a case where the transport body 70 rotates backward (rotation in the direction along the arrow N in FIGS. 8 and 9) with a driving force from the driving unit 79, the second surface 72B comes into contact with the shaft portion 64 and the opening and closing portion 60 is moved in the reverse direction (the direction along the arrow T in FIG. 8) from the opening position to the closing position after the movement portion 76 (specifically, the second contact surface 76B) moves the shaft portion 64 of the opening and closing portion 60 positioned at the opening position to the position at which the shaft portion 64 comes into contact with the second surface 72B of the second blade 72. However, the present invention is not limited thereto. For example, a configuration in which the opening and closing portion 60 is moved to the closing position by a component other than the transport body 70 may also be adopted.

In addition, in the present exemplary embodiment, LA>LD, where LA is an interval between the movement portion 76 and the first surface 72A that is disposed, with respect to the movement portion 76, on a side to which the reverse direction (the direction along the arrow T in FIG. 12) extends and LD is a dimension (specifically, the diameter) of the shaft portion 64 in the reverse direction. However, the present invention is not limited thereto. For example, a configuration in which LA=LD may also be adopted.

In addition, in the present exemplary embodiment, the transport path 52 is inclined with respect to the axial direction of the developer accommodation portion 40 as seen in a side view such that the transport path 52 is close to the developer accommodation portion 40 on a side to which the opposite direction (specifically, the rearward direction) to the transport direction (specifically, the forward direction) extends, the transport direction being a direction in which the transport body 70 transports the developer G. However, the present invention is not limited thereto. For example, a configuration in which the transport path 52 is disposed to be parallel to the axial direction of the developer accommodation portion 40 may also be adopted.

In addition, in the present exemplary embodiment, the path width of the transport path 52 decreases toward the side to which the opposite direction (specifically, the rearward direction) extends. However, the present invention is not limited thereto. For example, a configuration in which the path width of the transport path 52 is constant in the opposite direction may also be adopted.

In the present exemplary embodiment, the outer diameter of the transport body 70 decreases toward the side to which the opposite direction (specifically, the rearward direction) extends. However, the present invention is not limited thereto. For example, a configuration in which the outer diameter of the transport body 70 is constant in the opposite direction may also be adopted.

In the present exemplary embodiment, as shown in FIG. 4, the transport path 52 is formed to have a substantially semicircular sectional shape of which a portion on the developer accommodation portion 40 side (specifically, the upper side) is a flat surface including the opening 54 and the opening and closing portion 60 is formed as a flat plate. However, the present invention is not limited thereto. For example, a configuration in which the opening and closing portion 60 is formed in a cylindrical shape may also be adopted and various shapes can be used as the shape of the opening and closing portion 60.

In addition, in the present exemplary embodiment, the transport body 70 includes, as the blade 74, a first blade 71 that is formed on the shaft portion 73 and that moves the developer G in the transport direction (specifically, the forward direction), and a second blade 72 that is formed on the shaft portion 73, that moves the opening and closing portion 60 to the opening position in the opposite direction (specifically, the rearward direction), and that is formed to be wound in a direction opposite to a direction in which the first blade 71 is wound. However, the present invention is not limited thereto. For example, a configuration in which the opening and closing portion 60 is moved to the opening position by the first blade 71 may also be adopted.

In addition, in the present exemplary embodiment, the outer diameter of the second blade 72 decreases toward the side to which the opposite direction (specifically, the rearward direction) extends. However, the present invention is not limited thereto. For example, a configuration in which the second blade 72 has the same outer diameter as the first blade 71 and the outer diameter of the second blade 72 is constant may also be adopted.

In addition, in the present exemplary embodiment, the spiral interval 72P (refer to FIG. 6) of the second blade 72 is smaller than the spiral interval 71P (refer to FIG. 6) of the first blade 71. However, the present invention is not limited thereto. For example, a configuration in which the spiral interval 72P (refer to FIG. 6) of the second blade 72 is the same as the spiral interval 71P (refer to FIG. 6) of the first blade 71 may also be adopted.

The present invention is not limited to the above-described exemplary embodiment, and various modifications, changes, and improvements can be made without departing from the scope of the present invention. For example, the above-described modification examples may be combined with each other as appropriate.

(((1)))

A transport device including:

a transport path that includes an opening through which a developer flows into the transport path;

an opening and closing portion that is provided to be movable along the transport path and that opens and closes the opening; and a transport body that is disposed in the transport path, that includes a blade formed in a spiral shape on an outer periphery of a shaft portion, that transports the developer flowing into the transport path through the opening and moves the opening and closing portion to an opening position with the blade by rotating forward, and that idly rotates with respect to the opening and closing portion moved to the opening position in a case of forward rotation.

(((2)))

The transport device according to (((1))), in which the opening and closing portion includes a contact portion that is able to come into contact with a first surface of the blade and a second surface opposite to the first surface, forward rotation of the transport body causes the first surface to come into contact with the contact portion and causes the opening and closing portion to be moved in a movement direction from a closing position to the opening position, and backward rotation of the transport body causes the second surface of the blade to come into contact with the contact portion and causes the opening and closing portion to be moved from the opening position to the closing position in a reverse direction with respect to the movement direction after a movement portion formed on the shaft portion moves the contact portion of the opening and closing portion positioned at the opening position to a position at which the contact portion comes into contact with the second surface in the reverse direction.

(((3)))

The transport device according to (((2))), in which an interval between the movement portion and the first surface that is disposed, with respect to the movement portion, on a side to which the reverse direction extends is larger than a dimension of the contact portion in the reverse direction.

(((4)))

The transport device according to any one of (((1))) to (((3))), further including:

an accommodation portion that is formed in a cylindrical shape extending along one direction and that accommodates the developer that flows into the transport path through the opening, in which the transport path is inclined with respect to the one direction such that the transport path is close to the accommodation portion on a side to which an opposite direction to a transport direction extends, the transport direction being a direction in which the transport body transports the developer.

(((5)))

The transport device according to (((4))), in which a path width of the transport path decreases toward the side to which the opposite direction extends.

(((6)))

The transport device according to (((5))), in which an outer diameter of the transport body decreases toward the side to which the opposite direction extends.

(((7)))

The transport device according to any one of (((4))) to (((6))), in which the transport path is formed to have a substantially semicircular sectional shape of which a portion on the accommodation portion side is a flat surface including the opening, and the opening and closing portion is formed as a flat plate.

(((8)))

The transport device according to any one of ((1))) to (((7))), in which the transport body includes, as the blade, a first blade that moves the developer in a transport direction, and a second blade that moves the opening and closing portion to the opening position in an opposite direction to the transport direction and that is formed to be wound in a direction opposite to a direction in which the first blade is wound.

(((9)))

The transport device according to (((8))), in which an outer diameter of the second blade decreases toward a side to which the opposite direction extends.

(((10)))

The transport device according to (((8))) or (((9))), in which a spiral interval of the second blade is smaller than a spiral interval of the first blade.

(((11)))

An image forming apparatus including:

the transport device according to any one of (((1))) to (((10))); and an image forming unit that forms an image on a recording medium by means of the developer transported by the transport device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transport device comprising:

a transport path that includes an opening through which a developer flows into the transport path;

an opening and closing portion that is provided to be movable along the transport path and that opens and closes the opening; and a transport body that is disposed in the transport path, that includes a blade formed in a spiral shape on an outer periphery of a shaft portion, that transports the developer flowing into the transport path through the opening and moves the opening and closing portion to an opening position with the blade by rotating forward, and that idly rotates with respect to the opening and closing portion moved to the opening position in a case of forward rotation, an accommodation portion that is formed in a cylindrical shape extending along one direction and that accommodates the developer that flows into the transport path through the opening, wherein the transport path is inclined with respect to the one direction such that the transport path is close to the accommodation portion on a side to which an opposite direction to a transport direction extends, the transport direction being a direction in which the transport body transports the developer.

2. The transport device according to claim 1 wherein the opening and closing portion includes a contact portion that is able to come into contact with a first surface of the blade and a second surface opposite to the first surface, forward rotation of the transport body causes the first surface to come into contact with the contact portion and causes the opening and closing portion to be moved in a movement direction from a closing position to the opening position, and backward rotation of the transport body causes the second surface of the blade to come into contact with the contact portion and causes the opening and closing portion to be moved from the opening position to the closing position in a reverse direction with respect to the movement direction after a movement portion formed on the shaft portion moves the contact portion of the opening and closing portion positioned at the opening position to a position at which the contact portion comes into contact with the second surface in the reverse direction.

3. The transport device according to claim 2, wherein an interval between the movement portion and the first surface that is disposed, with respect to the movement portion, on a side to which the reverse direction extends is larger than a dimension of the contact portion in the reverse direction.

4. An image forming apparatus comprising:

the transport device according to claim 3; and an image forming unit that forms an image on a recording medium by means of the developer transported by the transport device.

5. An image forming apparatus comprising:

the transport device according to claim 2; and an image forming unit that forms an image on a recording medium by means of the developer transported by the transport device.

6. The transport device according to claim 1, wherein a path width of the transport path decreases toward the side to which the opposite direction extends.

7. The transport device according to claim 6, wherein an outer diameter of the transport body decreases toward the side to which the opposite direction extends.

8. An image forming apparatus comprising:
the transport device according to claim 7; and
an image forming unit that forms an image on a recording medium by means of the developer transported by the transport device.

9. An image forming apparatus comprising:
the transport device according to claim 6; and
an image forming unit that forms an image on a recording medium by means of the developer transported by the transport device.

10. The transport device according to claim 1,
wherein the transport path is formed to have a substantially semicircular sectional shape of which a portion on the accommodation portion side is a flat surface including the opening, and
the opening and closing portion is formed as a flat plate.

11. An image forming apparatus comprising:
the transport device according to claim 10; and
an image forming unit that forms an image on a recording medium by means of the developer transported by the transport device.

12. An image forming apparatus comprising:
the transport device according to claim 1; and
an image forming unit that forms an image on a recording medium by means of the developer transported by the transport device.

13. A transport device comprising:
a transport path that includes an opening through which a developer flows into the transport path;
an opening and closing portion that is provided to be movable along the transport path and that opens and closes the opening; and
a transport body that is disposed in the transport path, that includes a blade formed in a spiral shape on an outer periphery of a shaft portion, that transports the developer flowing into the transport path through the opening and moves the opening and closing portion to an opening position with the blade by rotating forward, and that idly rotates with respect to the opening and closing portion moved to the opening position in a case of forward rotation,
wherein the transport body includes, as the blade,
a first blade that moves the developer in a transport direction, and
a second blade with an outer diameter decreases toward a side to which the opposite direction extends that moves the opening and closing portion to the opening position in the opposite direction and that is formed to be wound in a direction opposite to a direction in which the first blade is wound.

14. The transport device according to claim 13,
wherein a spiral interval of the second blade is smaller than a spiral interval of the first blade.

15. An image forming apparatus comprising:
the transport device according to claim 14; and
an image forming unit that forms an image on a recording medium by means of the developer transported by the transport device.

16. An image forming apparatus comprising:
the transport device according to claim 13; and
an image forming unit that forms an image on a recording medium by means of the developer transported by the transport device.

* * * * *